United States Patent [19]

Butler et al.

[11] Patent Number: 5,067,379
[45] Date of Patent: Nov. 26, 1991

[54] ELECTRONIC DISPLAY SYSTEM FOR WIRE STRIPPING MACHINE

[75] Inventors: John D. Butler, Germantown; Vinod K. Chopra, Brookfield, both of Wis.

[73] Assignee: Mechtrix Corporation, Menomonee Falls, Wis.

[21] Appl. No.: 325,435

[22] Filed: Mar. 20, 1989

[51] Int. Cl.$^5$ .............................................. H02G 1/12
[52] U.S. Cl. .......................................... 83/13; 81/9.4;
81/9.51; 83/62; 83/947; 83/76.7; 83/522.23;
364/474.37; 364/551.02
[58] Field of Search .................. 83/13, 76.7, 76.9, 62,
83/623, 924, 947, 522.23; 81/9.4, 9.51; 33/784,
819, 820, 831, 555.1; 364/474.37, 551.02

[56] References Cited

U.S. PATENT DOCUMENTS

| | | | |
|---|---|---|---|
| 3,645,156 | 2/1972 | Meyer et al. | 81/9.51 |
| 3,924,336 | 12/1975 | Inoue | 33/820 |
| 4,745,828 | 5/1988 | Stepan | 81/9.51 |
| 4,873,901 | 10/1989 | Stoehr | 81/9.51 |

*Primary Examiner*—Hien H. Phan
*Attorney, Agent, or Firm*—Fuller, Ryan & Hohenfeldt

[57] ABSTRACT

An electro/mechanical feedback system and method for displaying the positional and sizing information relative to the hole size formed by closed stripping blades of a wire stripping machine. The feedback system includes a pair of rotary optical encoders that are tied to the respective blade tool holders via adjusting screws. The adjusting screws provide infinite adjustment resolution. Turning the adjusting screws opens or closes the blades. The encoders convert the adjusting screw rotational information into blade translatory information, which is displayed. The displayed information represents positional information of each of the blades as well as the actual diameter of the cutting hole formed by the closed blades at a true zero position. The adjusting screw includes a torque head that limits adjusting screw torque to a predetermined amount. The present invention includes a positive stop used as a home position for each blade. Translating the blade tool holders against the positive stops and slipping the torque heads of the adjusting screws assures accurate home positions for calibrating the feedback system.

28 Claims, 5 Drawing Sheets

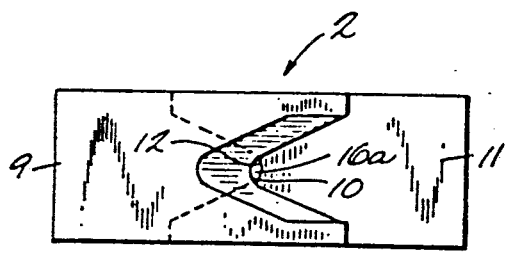
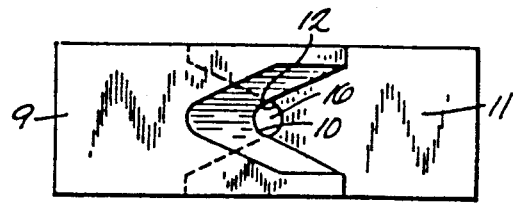
Fig. 1a
Fig. 1b
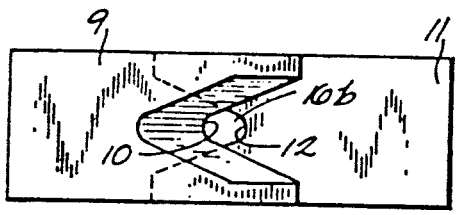
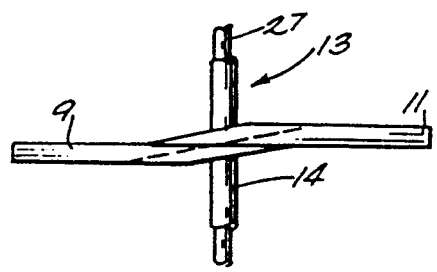
Fig. 1c
Fig. 2
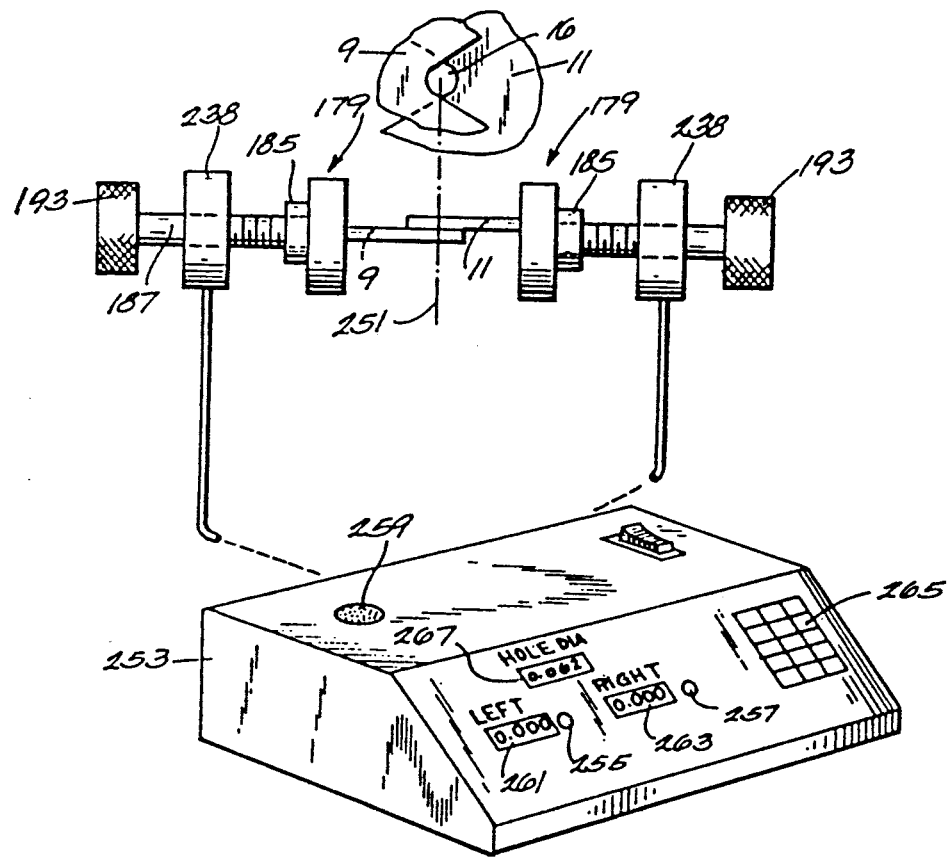
Fig. 7

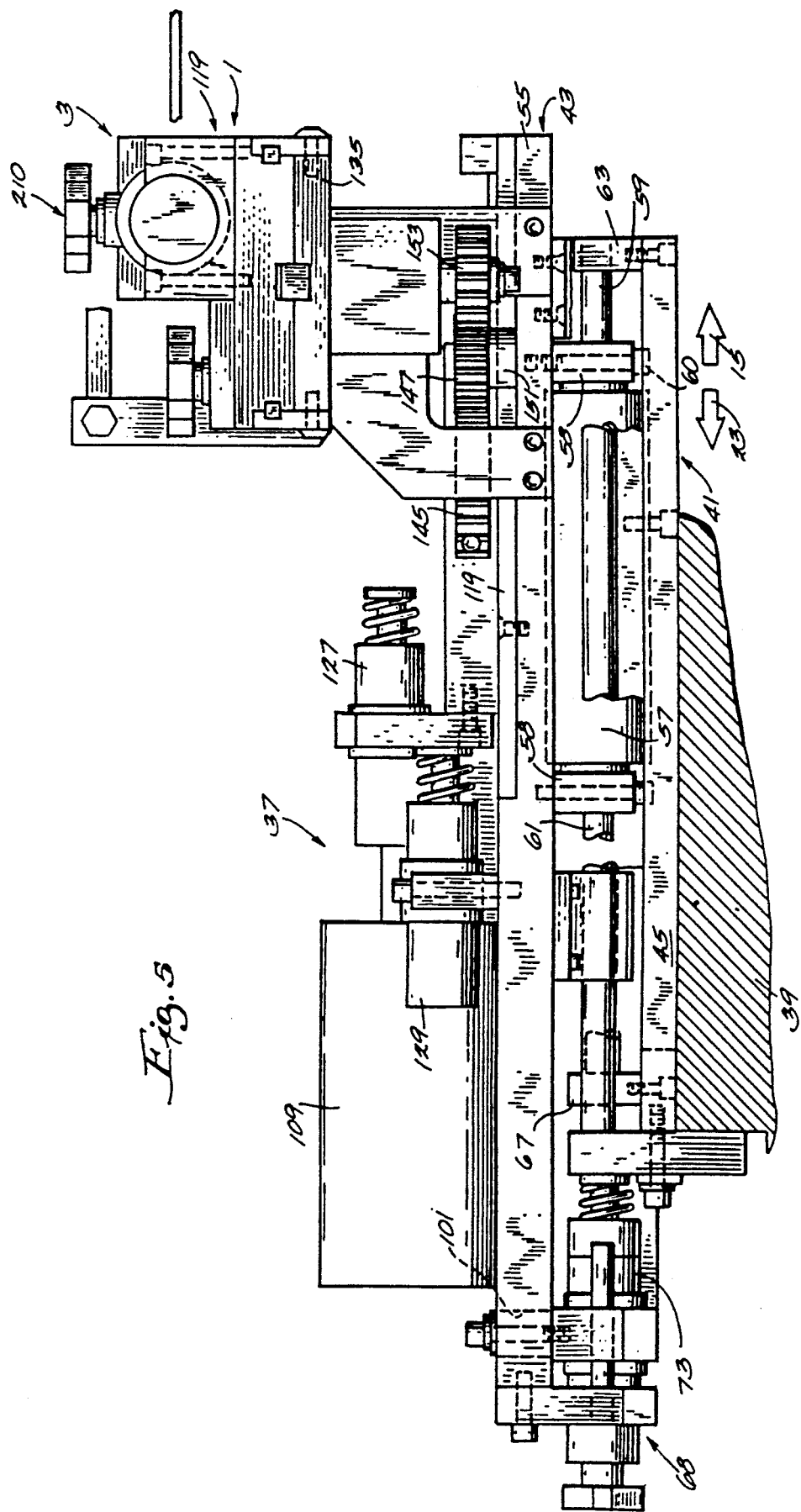

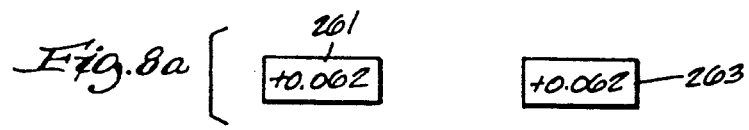
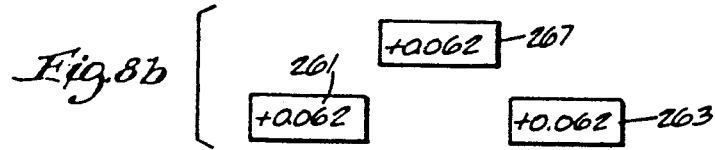
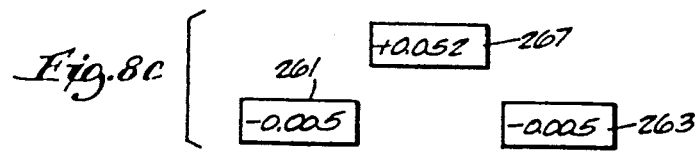
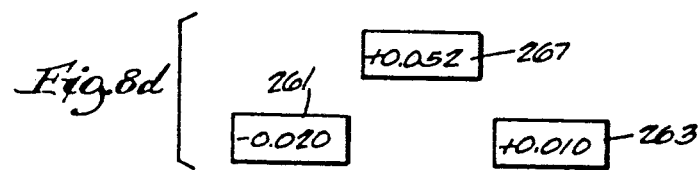
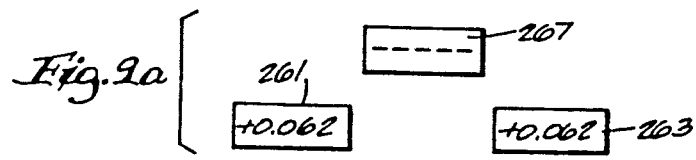
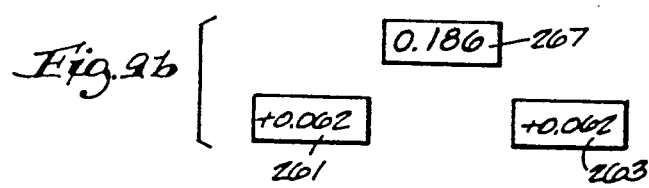
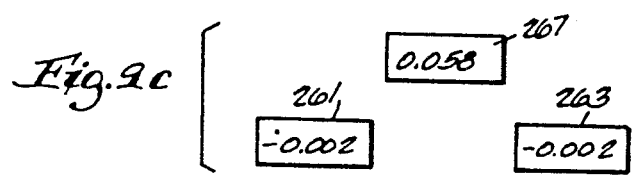

ELECTRONIC DISPLAY SYSTEM FOR WIRE STRIPPING MACHINE

BACKGROUND OF THE INVENTION

1. Field of the Invention

This invention pertains to processing insulated electrical conductors, and more particularly to apparatus for accurately positioning and displaying information representing the positions of wire stripping blades.

2. Description of the Prior Art

Recent trends in the automotive and electronics industries have been to use ever smaller gauge insulated electrical and thinner wall insulations. In automotive applications, that trend is the result of the increased usage of on-board electronics, the increased usage of longer wire lengths to reduce the number of connectors and splices, and the limited space available for wire passages. Presently, automobiles manufactured in the United States contain an average of approximately 1900 feet of insulated wire, of which 70% is classified as thin wall. Thin wall wire is defined as having a minimum insulation wall thickness of approximately 0.11 inches. It is estimated that by 1992 an average of approximately 2400 feet of wire will be used in every automobile, 90% of which being thin wall. In deed, experimental ultra thin wall wire is now being considered for future applications.

The trend to smaller insulated electrical conductors has caused considerable problems with precisely and reliably stripping the very thin insulations. Suitable blades for stripping very thin insulation have been developed, and they are commercially available. For example. U.S. Pat. No. 4,577,405 describes stripping blades that work very well with thin wall insulation. In addition, methods are known by which the optimum stripping blade hole size for a particular conductor/insulation combination can be accurately predetermined. Other methods have been developed for selecting the closest available "best-fit" blade hole size. On the other hand, prior wire processing machinery itself is generally not capable of precisely and reliably closing stripping blades to a desired specific cutting hole size. For example, while new techniques may enable a calculation to be made that 0.051 inches is the optimum diameter of the stripping blade cutting hole for a twenty gauge conductor with thin wall insulation, it is virtually impossible for prior machinery to set the blade hole to that size.

To meet the demand for a precision and reliable machine for cutting and stripping insulated electrical conductors, the wire processing machine described in copending U.S. Pat. application Ser. No. 235,213, now U.S. Pat. No. 4,961,357, dated Oct. 9, 1990 was developed. That machine has a cutterhead that is guided in a common plate to open and close over the insulated electrical conductor being processed. The two tool holders of the cutterhead are adjustable independent of each other along two cutterhead slides. The machine of U.S. Pat. No. 4,961,357 is exceptionally rigid, and it is constructed to maintain precision performance on a long term basis.

It has been found desirable that wire processing machines include a system that provides information to the machine operator of the actual blade hole size at a particular blade setting and with particular blades clamped in the cutterhead. Prior equipment does not possess such capabilities. As a result, at present the blades are adjusted open or closed based on a visual inspection of a test wire strip. If the test strip results in a cut, nicked or scraped conductor, the blade hole is adjusted open. If the insulation is not properly pulled off the test strip, the blade hole is closed. Such trial-by-error methods cannot meet present demands for efficiently and precisely processing thin wall/small gauge conductors on a production basis.

SUMMARY OF THE INVENTION

In accordance with the present invention, a feedback system is provided in a wire processing machine that enables accurate positioning of the stripping blades and that displays information representing the blade positions and the cutting hole size formed by the closed blades. This is accomplished by apparatus that includes independent rotary encoders and readouts in combination with infinitely adjustable mechanical blade adjustment means.

The wire processing machine has a cutterhead comprised of two independent cutterhead slides. A stripping blade is clamped in each cutterhead slide. The cutterhead slides reciprocate toward and away from each other in timed relationship to open and close the blades over the insulated electrical conductor being processed. The stripping blades are clamped within respective tool holder assemblies that are supported on respective tool holder slide yokes. A separate blade adjustment mechanism is employed on each cutterhead slide to independently adjust the position of the tool holder assembly and blade along the respective yoke in the directions of cutterhead slide reciprocation.

In the preferred embodiment, each blade adjustment mechanism comprises an adjusting screw received in a nut attached to the tool holder assembly. The adjusting screw is supported by and axially restrained in a block fixed to the yoke. Accordingly, rotating the adjusting screw translates the tool holder assembly and blade along the yoke. The tool holder assembly includes a clamping device for releasably clamping the tool holder assembly to the yoke.

The function of the rotary encoders is to provide feedback information on the amount of adjustment made to the tool holder assemblies and blades by the respective blade adjustment mechanisms. The encoder bore is press fit over the respective adjusting screw, and the encoder housing is fixed to the cutterhead slide yoke. Discrete pulses produced by the encoder as its rotor rotates in unison with the adjusting screw are counted by an appropriate electronic circuit. The circuit converts the pulses to information that represents positional information of the tool holder assembly and blade on the yoke, and the information is displayed on suitable independent readouts.

To calibrate the feedback system, a positive stop is fixed to each yoke. The positive stop limits the travel of the tool holder assembly along the yoke in one direction. The stop is accurately located from the machine center line so as to serve as a home position for the blades. In the calibration mode, the tool holder assembly is brought snugly against the stop. To limit the force of the tool holder assembly against the home stop while permitting accurate contact therewith, the blade adjustment mechanism comprises a torque limiting device herein called a torque head that drives the adjusting screw. The torque head is designed such that torque applied to the adjusting screw is limited to a preset value. Once the applied torque reaches the preset value, the torque head slips. At that point, the tool holder assembly is accurately against the stop, and a sensor switch signals the control system to set the home position settings. Thereafter, information displayed on the read outs representing positional information of the blades as they are translated is based on the machine center line reference.

Blade positional information from the encoders is also used in combination with information concerning the predetermined theoretical optimum cutting hole size of the particular blades when they are closed. The machine operator keys in the theoretical optimum hole size of the blades. The blade positional information and the theoretical optimum cutting hole size are used to calculate the actual cutting hole size formed by the pair of blades when closed. As the blades are translated on the yoke by the blade adjustment means, the changing actual cutting hole size is continuously displayed on another read out.

By rotating the torque heads of the two blade adjustment mechanisms, the machine operator is able to move the blades independently until they are symmetrical about the cutterhead center line and the insulated electrical conductor axis, and at the proper closed position to create the desired cutting hole size for the particular insulated electrical conductor being stripped. When at the desired position, the clamping device on each tool holder assembly is tightened to clamp the tool holder assemblies to the respective yokes.

Other aims and advantages of the invention will become apparent to those skilled in the art upon reading the disclosure.

BRIEF DESCRIPTION OF THE DRAWINGS

FIGS. 1a-1c are schematic views depicting typical cutting hole shapes obtainable by a pair of cooperating wire stripping blades;

FIG. 2 is a top view of a pair of stripping blades closed over an insulated electrical conductor;

FIG. 5 is a side view of the wire processing machine of FIGS. 3 and 4;

FIG. 7 is a schematic view of the feedback system of the present invention;

FIGS. 8a-8d show information displayed by the present invention that illustrates the operation of the feedback system; and FIGS. 9a-9c show illustrative information displayed by the read outs of the present invention at various times during the set up of the feedback system.

DETAILED DESCRIPTION OF THE INVENTION

Figure 3:
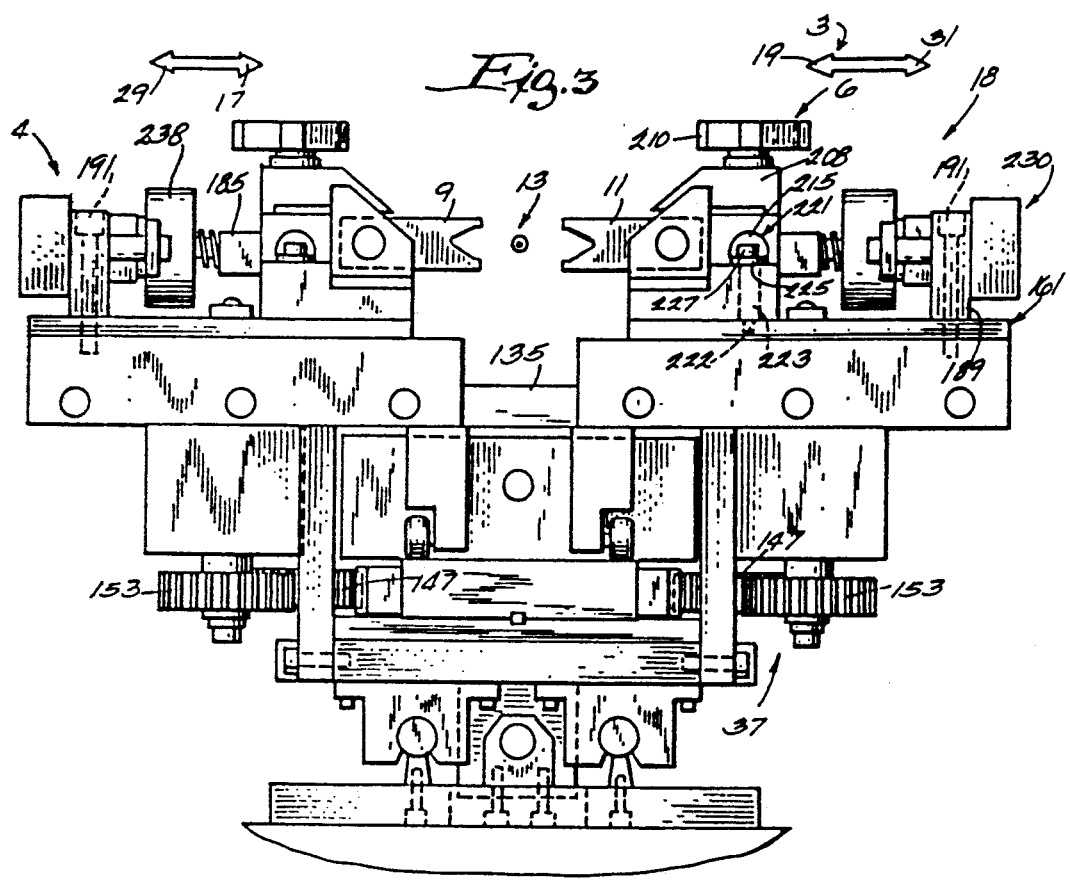
FIG. 3 is a front view of a wire processing machine that advantageously uses the present invention.

Although the disclosure hereof is detailed and exact to enable those skilled in the art to practice the invention, the physical embodiments herein disclosed merely exemplify the invention which may be embodied in other specific structure. The scope of the invention is defined in the claims appended hereto.

General

Referring to FIGS. 1 and 2, a pair of insulation stripping blades 2 are illustrated. The blade pair 2 may consist of blades 9 and 11 such as are described in U.S. Pat. No. 4,577,405. The blades 9 and 11 have respective radius cutting edges 10 and 12 for closing perpendicularly to the axis of an insulated electrical conductor 13. When closed, the blades cooperate to circumferentially slice the insulation 14 of the electrical conductor 13 through to the conductor 27.

There is only one specific position of the blades 9 and 11 whereat the cutting hole 16 defined by the respective cutting edges 10 and 12 is optimally round. That position is indicated in FIG. 1b. Closing or opening the blades from the optimum position of FIG. 1b results in elliptical cutting holes 16a or 16b that do not conform to the periphery of the conductor 27. For example, in FIG. 1a, the blades are shown closed relative to the optimum position of FIG. 1b. In FIG. 1c, the blades are shown opened relative to FIG. 1b. Therefore, it is very important to be able to set the blades at their optimum cutting hole size of FIG. 1b.

Figure 4:
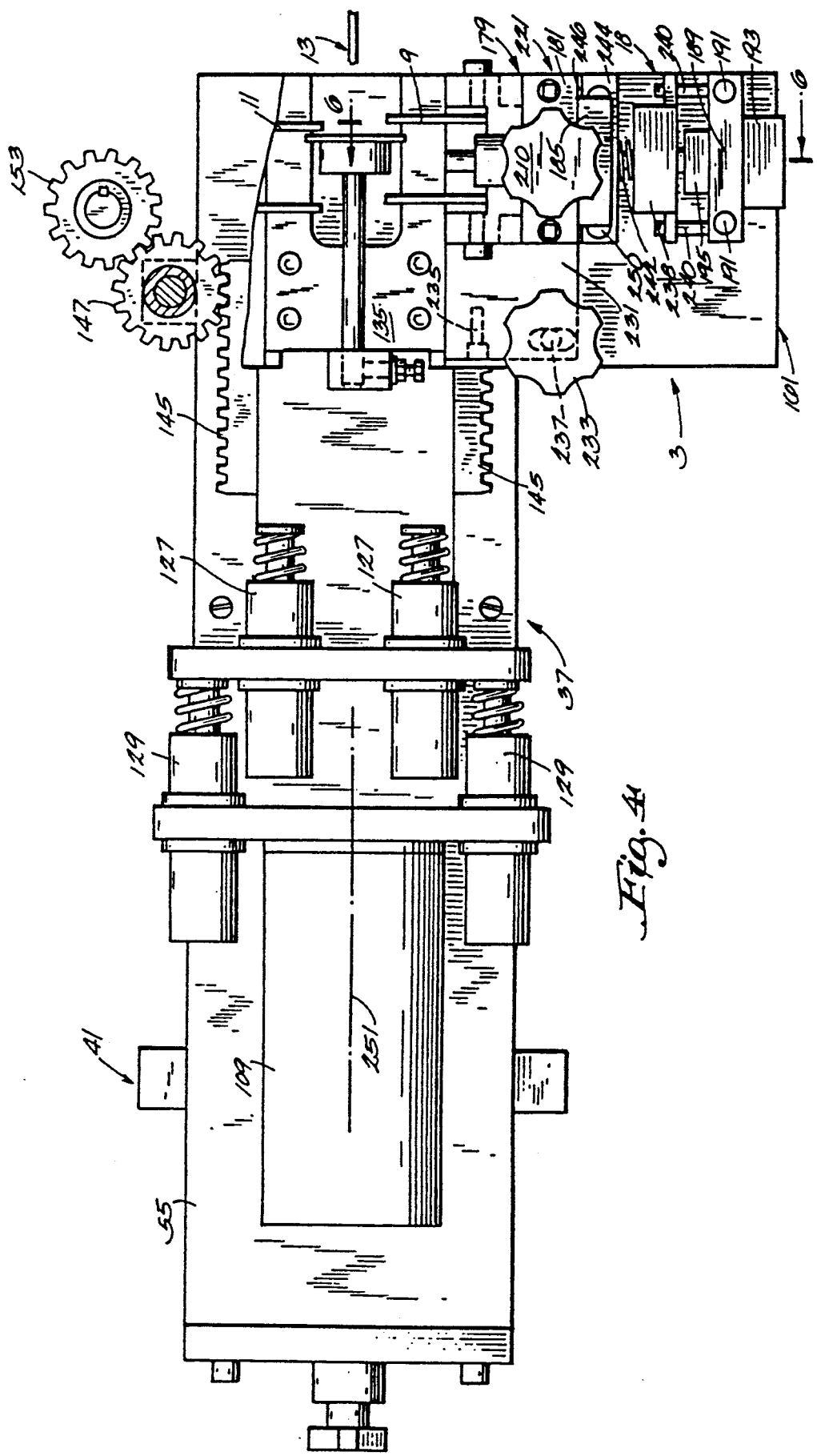
FIG. 4 is a top view of the wire processing machine of FIG. 3.

In accordance with the present invention, an electro/mechanical feedback system is incorporated into a wire stripping machine for accurately setting the optimum cutting hole size 16 of wire stripping blades such as blades 9 and 11. Referring to FIGS. 3-5, an electro/mechanical system 18 is shown in combination with a wire stripping machine 37.

Wire Stripping Machine

The particular wire stripping machine 37 illustrated is described in U.S. Pat. No. 4,961,357, the disclosure of which is incorporated herein by reference.

By way of a brief background, the wire stripping machine 37 comprises a cutterhead 3 that opens and closes over the insulated electrical conductor. The cutterhead 3 is made up of a left cutterhead slide 4 and a substantially symmetrical right cutterhead slide 6. The blades 9 and 11 are clamped in the cutterhead slides 4 and 6, respectively. The cutterhead slides 4 and 6 travel in the directions of arrows 17 and 19, respectively, to close over the insulated electrical conductor, and the cutterhead slides travel in the directions of arrows 29 and 31, respectively, to open the blades from the electrical conductor. Each cutterhead slide comprises a respective yoke 161. The two yokes 161 are accurately aligned with each other and are guided for precision reciprocation along a common plate 135. Looking also at FIG. 6, the yokes are driven by respective cams 159 that are rotatably mounted in the common plate 135. In turn, the cams 159 are driven by a fluid cylinder 109 through a pair of racks 145 and suitable gears 147 and 153.

In addition to opening and closing over the insulated electrical conductor 13, the blades 9 and 11 also reciprocate longitudinally along the electrical conductor in the directions of arrows 15 and 23 (FIG. 5). For that purpose the cylinder 109 racks 145, gears 147 and 153 and cutterhead 3 are mounted on a base plate 55. In turn, the base plate 55 is mounted for reciprocation in the directions of arrows 15 and 23 on a bottom base assembly 41. The bottom base assembly 41 may be mounted to any desired frame member 39.

Reciprocation of the base plate 55 on the bottom base assembly 41 may be by means of a second fluid cylinder 57 mounted to the base plate and acting through piston rods 59 and 61. The piston rods 59 and 61 are connected via respective blocks 63 and 67 to the bottom base assembly. A stripping stroke adjustment mechanism 68 sets the stroke of the base plate on the bottom base assembly in the direction of arrow 15. Decelerators 73 cushion the base plate to smooth stops at the ends of the strokes thereof in the direction of arrow 15. In addition, decelerators 127 and 129 cushion the racks 145 and cutterhead 3 at the ends of the strokes of the first cylinder 109.

Cutterhead Slides

Figure 6:
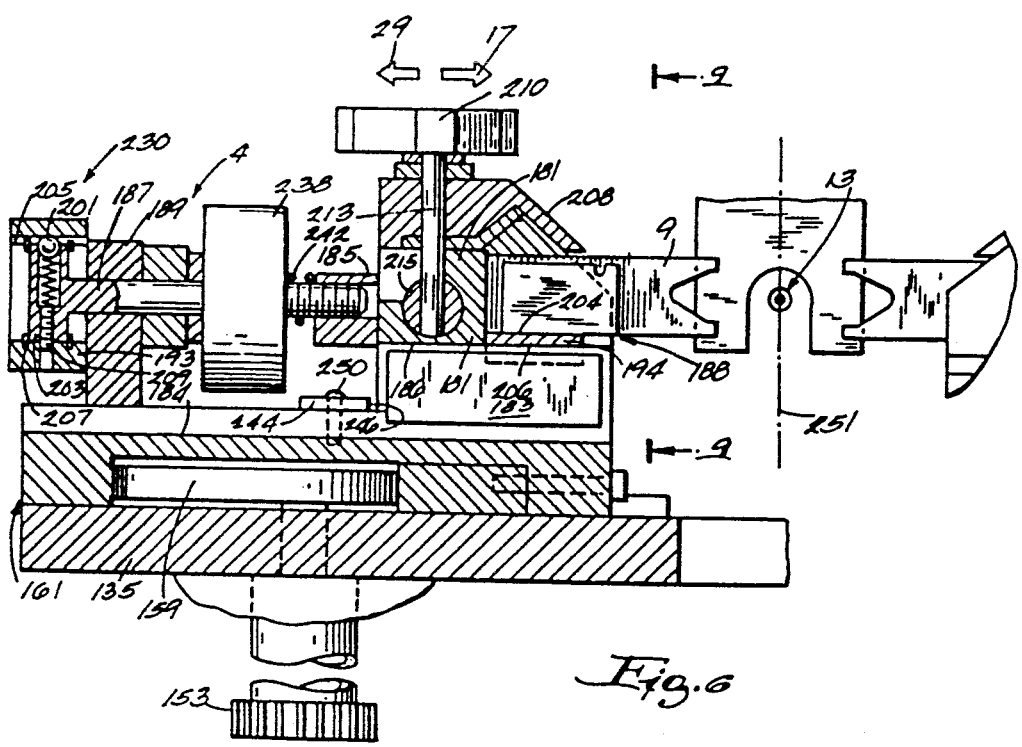
FIG. 6 is a cross sectional view taken along lines 6—6 of FIG. 4.

As best shown in FIGS. 3, 4 and 6, a tool holder assembly 179 is supported on each cutterhead slide yoke 161. Each tool holder 179 includes a stepped support 181, to which is removably locked a two-piece tool holder 188. The blades 9 and 11 are accurately clamped in the tool holders 188 on the respective cutterhead slides 4 and 6. Locking of the tool holder 188 to the step support 181 may be by a latch 208, a knob 210, a latch pin 215 rotatably mounted within the stepped support, and a threaded rod 213 joining the knob to the latch pin.

The tool holder assemblies 179 are independently adjustable on the cutterhead slides 4 and 6 in the directions of arrows 17, 29 and 19, 31, respectively. Each tool holder assembly is accurately guided on its respective cutterhead slide by a key 183 that is pressed into a key way 184 in the yoke 161. The key 183 is slidingly received in aligned keyways 186 in the stepped support 181 and 206 in the tool holder 188.

To adjust the tool holder assemblies 179 along the key 183, a blade adjustment mechanism 230 is incorporated into each cutterhead slide 4 and 6. The blade adjustment mechanism comprises an adjusting screw 187 that has one end threadingly received into a nut 185 attached to the backside of the stepped support 181. The adjusting screw 187 passes through a clearance hole in a support block 189 that is fixed to the yoke 161 by screws 191. The support block 189 is captured between a knob 193 and a collar 195 that are assembled to the adjusting screw. Accordingly, rotating the knob 193 causes the stepped support 181 to slide on the key 183 along the yoke 161. The adjustment mechanism with the threaded adjusting screw 187 enables the tool holder assemblies 179 and the blades 9 and 11 to be set with infinite adjustment resolution.

The torque that can be applied to the adjusting screws 187; in the illustrated construction, limiting the torque is achieved using knob 193 and a detent comprised of a spring loaded ball 201. The ball 201 is inserted into a transverse hole in a head 203 of the second end of the adjusting screw. The ball 201 engages a longitudinally extending groove 205 in the inner diameter of the knob 193. The knob may be retained on the assembly screw head 203 by snap rings 207. Set screw 209 enables variable compression to be applied on the ball to set the slipping torque of the knob 193 on the adjusting screw 187. Thus, rotating the knob 193 until it overcomes the force of the detent determines the maximum torque on screw 187 and the maximum linear force applicable to the stepped support 181.

To assure that the tool holder assemblies 179 remain in facing contact with the respective yokes 161 at all times, guide screws 221 are employed between the stepped supports 181 and the yokes 161. Preferably, two guide screws 221 are used with each cutterhead slide 4 and 6. Each guide screw has a threaded end 222 received in corresponding holes in the yoke. A guide portion 223 fits within appropriate slots in the stepped support. A flange 225 is located on the guide portion to snugly restrain the stepped support against the yoke. For ease of assembly, the guide screws may have square heads 227.

The cutterhead 3 also includes a locking plate 231 and associated calibration knob 233 on each cutterhead slide 4 and 6. The locking plate 231 is fastened to the side of the stepped support 181 with screws 235. A threaded rod passes through a slot 237 in plate 231 and engages threads in the yoke 161. Washers are placed between the calibration knob 233 and the plate 231. A sliding clearance is present between the clamping plate and the yoke when the calibration knob 233 is turned to loosen the plate from the yoke. The plate is loosened when the blade adjustment mechanism 229 is actuated to translate the tool holder assembly 179 on the yoke. When the tool holder assembly is at the desired location, the calibration knob 233 is turned to draw the clamp plate firmly against the yoke and thereby assist in locking the tool holder assembly in place.

Feedback System

To provide information on the amount of translation induced in the tool holder assemblies 179 by the respective blade adjustment means 230, the feedback system 18 of the present invention includes a pair of rotary optical encoders 238. We have found that a series M15 Module Optical Encoder manufactured by BEI Motion Systems Company of San Marcos, CA, works very well in the wire stripping machine 37. The encoders 238 have rotors that are press fit over the adjusting screws 187 between the nuts 185 and the support blocks 189. The encoder bodies are prevented from rotating with the adjusting screws 187 by dowel pins 240 press fit into the support blocks 189 and passing through aligned holes in the encoder housings as shown in FIG. 4. To eliminate back lash between the adjusting screw and nut threads, a compression spring 242 is placed over the adjusting screw between the nut and the encoder.

As the knobs 193 of the blade adjustment mechanism 229 are rotated to translate the tool holder assemblies 179 and the blades 9 and 11, the encoders 238 sense the adjusting screw rotation and emit discrete electrical pulses. The pulses correspond to the angular rotation of the adjusting screw 187, and thus the pulses can be converted into information corresponding to the translation of the tool holder assemblies. This is accomplished by correlating the encoder resolution with the pitch of the adjusting screw. For example, if the adjusting screw threads have a pitch of 0.062 inches, and the encoder has a resolution of 100 steps per revolution, the encoder produces 100 pulses for each 0.062 inches of tool holder assembly travel. Thus, if the knob 193 is rotated such that 25 pulses are emitted by the encoder, the tool holder assembly is known to have traveled 0.016 inches.

The feedback system 18 further includes a positive mechanical stop 244 on each cutter head slide 4 and 6. The stops 244 limit the travels of the respective tool holder assemblies 179 in their respective directions away from the insulated electrical conductor 13. The positive stops are set such that their respective front edges 246 are very accurately equidistant from the machine longitudinal center line 251 for any given position of the cutterhead slides 4 and 6 on the common plate 135. The positive stops are fixed to their respective yokes by fasteners 250. The positive stops 244 serve as home positions for the tool holder assemblies and blades 9 and 11. The home positions are especially useful when calibrating the feedback system 18. In the calibration mode, the knob 193 of each blade adjustment mechanism torque head 230 is rotated until the step support 181 strikes the corresponding stop front edge 246. With the stepped support against the stop, additional torque applied to the torque head causes the knob 193 to slip on the adjusting screw 187. At that point, the tool holder assembly and the blades clamped therein are at the home position setting.

Now turning to FIG. 7, an electrical cabinet 253 is shown that displays information related to the feedback system 18. The cabinet 253 includes a first indicator lamp 255 that corresponds to the left cutterhead slide 4 and a second indicator lamp 257 that corresponds to the right cutterhead slide 6. When a tool holder assembly 179 is translated by means of the corresponding blade adjustment mechanism 229, such that the stepped support 181 is against the front edge 246 of the positive stop 244, the corresponding lamp 255 or 257 will light. The feedback system 18 may also include a bell 259 that rings a few times when both tool holder assemblies are in their respective home positions. The bell 259 therefore indicates that the true home position for the cutterhead 3 has been found. In that situation, a first read out 261 associated with the left cutterhead slide 4 displays the actual position of the blade relative to the true zero position. The zero position refers to that unique position of the cooperating blades, when they are fully closed, and the blade cutting hole is optimally round, as in FIG. 1b. At the zero position, it is highly desirable that the read out 261 displays 0.000. Accordingly, the actual display of the readout 261 indicates the distance the blade is positioned off the center of the cutterhead 3. Any distance from the cutterhead centerline to the home position can be chosen. By way of example, a distance of 0.062 inches is chosen. Thus, in FIG. 8a, the left readout 261 displays the digits plus 0.062. The "+" sign associated with the display indicates that the blade is opened away from the true zero position. Similarly, a second read out 263 associated with the right cutterhead slide 6 displays the digits plus 0.062. Therefore, with the example chosen, when the tool holder assemblies are in their home positions, the blades are always opened to 0.062 inches from their true zero position.

The feedback system 18 and cabinet 253 further comprise a third read out 267 that is utilized to indicate the actual size of the blade cutting hole 16 that will be produced by the closed blades for the particular blades 9 and 11 clamped in the cutterhead 3 and with the particular locations of the blades from the true zero position. Also see FIGS. 1 and 7. The machine operator is required to key in via key pad 265 the theoretical optimum cutting hole size of the blades in the cutterhead. As an example, it will be assumed that the blades are designed to form a theoretical optimum cutting hole of 0.062 inches diameter. In that case, the machine operator keys in that value, and it is displayed on the third read out 267, FIG. 8b. Assuming the two tool holder assemblies are at their respective home positions, the read outs 261 and 263 also display plus 0.062 in FIG. 8b.

The theoretical optimum blade cutting hole size remains displayed in read out 267 long enough for the machine operator to verify that he has keyed in the correct theoretical optimum hole size. Thereafter, the feedback system control circuit causes the third read out 267 to display the value plus 0.186. That value is equal to the sum of the home positions of the left and right blades from the cutterhead zero position and the keyed-in value for the theoretical optimum blade cutting hole size. In this example the sum of those three values is 0.186.

From the home position, the knob 193 of the blade adjustment mechanism 230 on each cutterhead slide 4 and 6 is turned to close the blades 9 and 11. Simultaneously, as the blades are translated, the read outs 261 and 263 display information that represents the instantaneous positions of the blades relative to the true zero position. The knobs 193 are turned until the blade hole read out 267 displays the desired hole size for stripping the particular sized insulated electrical conductor 13 being processed. Continuing this example if the blades are manufactured with a theoretical optimum cutting hole size of 0.062 inches diameter, but the optimum hole size for the particular electrical conductor is 0.052 inches, both blade adjustment mechanisms 229 must be adjusted until both the left and right read outs 261 and 263, respectively, display −0.005. In that situation, the three read outs appear as in FIG. 8c. The value 0.052 is the sum of the left and right read out displays representing the positions of the closed blades relative to their true zero position, minus 0.005, plus the keyed-in value of the theoretical optimum blade cutting hole size, 0.062. Further, the displays for the left and right cutterhead slides show that the blades are positioned symmetrically about the cutterhead center line 251.

It is possible to obtain the optimum cutting hole size of 0.052 inches for the particular insulated electrical conductor 13 of this example without having the blades symmetrical about the cutterhead center line 251. For instance, the machine operator could turn the left blade adjustment mechanism 230 from the home position until the corresponding read out 261 displays the value minus 0.020, and he could turn the right blade adjustment mechanism until the read out 263 displayed the value plus 0.010. In that case, the blade hole read out 267 displays 0.052, the desired optimum cutting hole size. See FIG. 8d. However, it is immediately appreciated that although the blades will close to the correct optimum hole size of 0.052 inches, the center line of the blade cutting hole would not coincide with the cutterhead axis. It is a simple matter to readjust the left and right blade adjustment mechanisms 230 until both read outs 261 and 263 display the value −0.005, as is indicated in FIG. 8c.

The keys 183 and the guide screws 221 assure precise linear motion of the tool holder assemblies 179 as they are translated by the blade adjustment mechanisms 229 and tracked by the feedback system 18. With the blades 9 and 11 in the desired locations as indicated by the cabinet read outs 261, 163, and 267, the calibration knob 233 is turned to draw the clamp plate 231 against the yoke 161.

Operation

The general operation of the wire stripping machine 37 is explained in detail in U.S. Pat. No. 4,961,357.

To set up the feedback system 18 for accurately locating the blades 9 and 11 in the cutterhead 3, the machine operator first loosens the calibration knob 233. He turns the torque limited knobs 193 of the blade adjustment mechanisms 230 until the stepped supports 181 are backed against the respective positive stops 244. The machine operator continues to turn the knobs 193 until the detent force is overcome and the knobs 193 slip on adjustment screws 187 and the bell 259 sounds. At that point, the read outs 261 and 263 automatically reset to an assumed home position wherein the closed blades are actually opened 0.062 inches from the true zero position, as is shown in FIG. 9a. In FIG. 9a, the blade hole display of in read out 267 signals the operator to key in via the key pad 265 the theoretical optimum cutting diameter of the stripping blades clamped in the cutterhead 3. Assuming blades that make a theoretical optimum diameter hole of 0.062 inches are used, the operator keys in that value. The blade hole read out 267 displays 0.062 for approximately five seconds, so that the operator can verify correct data input. After that short time, the blade hole read out 267 changes to display the true blade opening size of 0.186, which is the sum of the left, right, and keyed in blade hole value. See FIG. 9b.

The machine operator then turns the two knobs 193 of the torque limiting adjustment mechanism 230 either separately or simultaneously until the read out 267 displays the desired stripping hole size for the particular insulated electrical conductor 13 to be processed and the left and right read outs 261 and 263, respectively, display the same values. For example, if it is assumed that the optimum cutting hole size is 0.058 inches for the particular electrical conductor being stripped, the torque heads 230 are adjusted until both read outs 261 and 263 display the value −0.002, as is shown in FIG. 9c. The blade hole read out 267 will simultaneously display the value 0.058, thereby showing that the blades are symmetrical about the cutterhead center line 251 and are set to properly strip the insulated electrical conductor. The calibration knob 233 is then tightened. The machine 37 is ready for precision stripping of insulated electrical conductors on a production basis.

Thus, it is apparent, that there has been provided in accordance with the invention, an electronic display system for wire stripping machines that fully satisfies the aims and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. Although a rotary transducer is disclosed a linear transducer could be employed.

We claim:

1. A method of setting blades for circumferentially cutting the insulation of an insulated electrical conductor to a selected diameter of insulation cut comprising the steps of:
   providing left and right yokes adapted to reciprocate perpendicularly toward and away from the insulated electrical conductor;
   providing respective tool holder assemblies on the left and right yokes, each tool holder assembly being translatable perpendicular to the insulated electrical conductor along the respective yoke;
   clamping blades in the respective tool holder assemblies for closing and opening over the insulated electrical conductor as the yokes reciprocate toward and away therefrom, the blades cooperating when closed to a true zero position to define a theoretical optimum blade cutting hole diameter;
   translating the left and right tool holder assemblies and respective blades and simultaneously sensing and displaying selected information representing positional information of the blades relative to the true zero position;
   the step of translating the blades and simultaneously sensing and displaying selected information comprising:
   translating each tool holder assembly away from the true zero position to predetermined home positions equidistant from the true zero position; and
   sensing and displaying selected information representative of the blade home positions.

2. The method of claim 1 wherein the step of translating the blades and simultaneously sensing and displaying selected information comprises the step of displaying information representing the theoretical optimum blade cutting hole size.

3. The method of claim 2 wherein:
   a. the step of displaying selected information representing positional information of each blade comprises the step of displaying the selected information of the blade clamped in the left yoke on a first read out, and displaying the selected information of the blade clamped in the right yoke on a second read out; and
   b. the step of displaying information representing the theoretical optimum blade cutting hole size comprises the step of displaying the information representing the theoretical optimum blade cutting hole size on a third read out.

4. The method of claim 3 further comprising the step of continuously displaying information representative of the actual diameter of an insulation cut that would be made by the closed blades at the instantaneous positions of the blades comprises the step of calculating the actual diameter of the insulation cut according to the formula:

$$S = R1 + R2 = R3, \text{ where}$$

S is the actual instantaneous diameter of the insulation cut;
R1 is the display in the first read out of information representing instantaneous positional information of the blade in the left tool holder assembly;
R2 is the display in the second read out of information representing instantaneous positional information of the blade in the right tool holder assembly; and
R3 is the display of the theoretical optimum blade cutting hole size in the third read out.

5. The method of claim 4 further comprising the steps of:
   a. translating the tool holder assemblies until the information displayed in the third read out displays information representing information of a predetermined blade cutting hole size for an insulation cut; and
   b. clamping the tool holder assemblies to the respective yokes.

6. The method of claim 1 comprising the further step of continuously displaying information representative of the actual diameter of an insulation cut that would be made by the closed blades at the instantaneous positions of the tool holder assemblies translated along the respective yokes.

7. A feedback system for displaying the position of a movable member comprising:
   a movable member and a stationary member adapted to support the movable member thereon;

adjustment means mounted to the stationary member for translating the movable member along the stationary member, the adjustment means having at least one rotatable component;

encoder means joined to the adjustment means rotatable component for producing electrical signals corresponding to the rotation of said components and for converting the signals into information representing positional information of the movable member;

readout means for displaying the information representing the positional information of the movable member; and means for limiting the torque that can be applied to the adjusting screw.

8. A feedback system for displaying the position of a movable member comprising:

a movable member and a stationary member adapted to support the movable member thereon;

adjustment means having an element fixedly mounted to the stationary member and a rotatable component mounted to said element and operatively coupled to said movable member for translating the movable member along the stationary member in response to rotation of said rotatable component;

encoder means coupled to the adjustment means rotatable component for producing electrical signals corresponding to the rotation of the components and means for converting the signals into information representing positional information of the movable member;

readout means for displaying the information representing the positional information of the movable member;

the adjustment means further comprising:

a knob releasably coupled to said rotatable component releasable detent means interposed between the rotatable component and the knob for causing the knob to slip relative to said rotatable component when a predetermined torque is applied to the knob; and a positive step fixed to the stationary member in the path of the movable member, rotating the knob until the movable member is translated against the positive stop causing the knob to slip relative to said rotatable component to cause said encoder means to discontinue producing said electric signals.

9. In a wire processing machine, a cutterhead slide comprising:

a yoke mounted for being driven toward and away from a line along which wire translates for being processed in the machine;

a tool holder assembly supported on the yoke for adjustable translation thereon;

at least one wire stripping blade clamped in the tool holder assembly;

an adjusting screw supported in the yoke and threadedly connected to the tool holder assembly;

torque limiting means coupled to the adjusting screw for rotating the adjusting screw with a predetermined maximum torque;

an encoder having at least two members one of which is movable by turning the adjusting screw and the other of which is fixed to the yoke, the encoder responding to turning said adjusting screw by producing electrical pulses;

readout means for converting the electrical pulses from the encoder into information representing positional information of the tool holder assembly on the yoke and for displaying the information; and a positive stop fixed to the yoke at a predetermined location thereon for being contacted by the tool holder assembly to limit the travel of said assembly in one direction, applying torque to the torque limiting means when the tool holder assembly is in contact with the positive stop causing the torque limiting means to slip relative to the adjusting screw and terminate producing pulses.

10. The cutterhead slide according to claim 9 wherein the torque limiting means comprises:

a knob retained on the adjusting screw; and detent means for limiting the torque transmitted from the knob to the adjusting screw, rotating the knob when the tool holder assembly is in contact with the positive stop causing the knob to slip on the adjusting screw and terminate producing of pulses by the encoder.

11. The cutterhead slide of claim 9 wherein the read out means further displays information representing positional information of the tool holder assembly at a home position when the tool holder assembly is located against the positive stop.

12. In a machine having a pair of blades that cooperate with each other to open and close over an insulated electrical conductor to form a generally round cutting hole of a theoretical optimum size when the blades are closed to a true zero position to cut the conductor insulation when in the closed position;

left and right cutterhead slides for receiving the respective blades therein and for reciprocating toward and away from the electrical conductor to close and open the blades over the conductor, comprising:

left and right yokes associated with the respective cutterhead slides;

left and right tool holder assemblies supported on the respective yokes, each tool holder assembly being translatable along the respective yoke;

blade adjustment means including an element mounted to each yoke and an adjusting screw threaded in the element and coupled to the respective tool holder assemblies for translating the respective tool holder assembly along the yoke perpendicular to the insulated electrical conductor;

a feedback system associated with the blade adjustment means for displaying information representing positional information of the respective tool holder assemblies relative to the true zero position;

a knob retained on the adjusting screw second end;

detent means interposed between the adjusting screw second end and the knob for engaging the knob to the adjusting screw, applying a torque to the knob greater than the predetermined amount causing the detent means to disengage the knob for the knob to slip and thereby limit the torque applied to the adjusting screw.

13. The machine according to claim 12 further comprising a positive stop fixed to each yoke, each positive stop having a respective edge located a predetermined distance from the true zero position, the stops being in the paths of the respective tool holder assemblies to limit their respective travels away form the true zero position, translating the respective tool holder assemblies against the respective positive stops causing said detent means to disengage said knob from said adjusting screw.

14. The machine of claim 12 wherein the feedback system further comprises:
   a. a first read out for displaying first predetermined information representing positional information of the left tool holder when it is translated against the left positive stop;
   b. a second read out for displaying first predetermined information representing positional information of the right tool holder when it is translated against the right positive stop; and
   c. key pad means for entering selected information representing information of the theoretical optimum cutting hole size of the blades clamped in the tool holder assemblies.

15. A wire processing machine having a pair of blades that cooperate with each other to open and close over an insulated electrical conductor to form a generally round cutting hole of a theoretical optimum size when the blades are closed to a true zero position to cut the conductor insulation when in the closed position;

left and right cutterhead slides for holding the respective blades and for reciprocating toward and away from the electrical conductor to close and open the blades over the conductor;
   left and right yokes mounted for moving toward and away from each other;
   left and right tool holder assemblies supported on the respective yokes, each tool holder assembly being translatable along the respective yoke;
   blade adjustment means mounted to each yoke for translating the respective tool holder assembly along the yoke perpendicular to the insulated electrical conductor;
   a feedback system associated with the blade adjustment means for displaying information representing positional information of the respective tool holder assemblies relative to said zero position;
   the feedback system including:
   a first readout for displaying selected information representing positional information of the left tool holder assembly on the left yoke;
   a second readout for displaying selected information representing positional information of the right tool holder on the right yoke;
   key pad means for manually supplying selected information representing information of the theoretical optimum cutting hole size of the blades; and
   a third readout for displaying information representing the theoretical optimum cutting hole size of the blades.

16. The machine according to claim 15 wherein the feedback system comprises a pair of optical encoders each having a rotor fixed to the respective adjusting screws and each having a housing fixed to the respective yokes for producing electrical representative of the position of the tool holder assemblies along the respective yokes.

17. The machine of claim 19 wherein the feedback system third read out displays information representing the actual cutting hole size of the blades according to the formula:

$$S = R1 + R2 + R3, \text{ where}$$

S1 is the information displayed in the third read out;
R1 is the information displayed in the first read out;
R2 is the information displayed in the second read out; and
R3 is the selected data keyed into the feedback system.

18. The machine of claim 19 wherein:
   a. each blade adjustment means comprises an adjusting screw rotatably supported in the respective yoke and threadedly received in the respective tool holder assembly; and
   b. the feed back system comprises:
      i. an optical encoder having a rotor pressed to each adjusting screw and a housing fixed to the respective yoke for producing electrical signals corresponding to the translation of the tool holder assembly along the yoke;
      ii. first read out means for converting the electrical signals from the encoder on the left yoke into selected information representing positional information of the left blade as the left tool holder assembly is translated by the blade adjustment means and for displaying the selected information; and
      iii. second read out means for converting the electrical pulses of the encoder on the right yoke into selected information representing positional information of the right blade as the tool holder assembly is translated by the blade adjustment means and for displaying the selected information.

19. In a machine having a pair of blades that cooperate with each other to open and close over an insulated electrical conductor to form a generally round cutting hole of a theoretical optimum size when the blades are closed to a true zero position to cut the conductor insulation in the closed position.
   left and right cutterhead slides for receiving the respective blades therein and for reciprocating toward and away from the electrical conductor to close and open the blades comprising:
   left and right yokes associated with the respective cutterhead slides;
   left and right tool holder assemblies supported on the respective yokes, each tool holder assembly being translatable along the respective yoke;
   blade adjustment means mounted to each yoke for translating the respective tool holder assembly along the yoke perpendicular to the insulated electrical conductor;
   a feedback system associated with the blade adjustment means for displaying information representing positions of the respective tool holder assemblies relative to the true zero position;
   encoders operative to produce variable electric signals in response to translation of the respective tool holder assemblies;
   first readout means for converting the electric signals from the encoder on the left yoke into information representing the position of the left blade as the left tool holder assembly is translated by the blade adjustment means and for displaying the selected information;
   second readout means for converting the electric signals of the encoder of the right yoke into information representing the position of the right blade as the tool holder assembly is translated by the blade adjustment means and for displaying the selected information;

a positive stop fixed to each yoke at a predetermined distance from the true zero position of the blades, the stops being in the paths of the respective tool holder assemblies to limit the respective travels thereof away from the true zero position;

torque head means associated with the adjusting screw for limiting the amount of torque that can be applied to the adjusting screw, so that translating the respective tool holder assemblies against the respective positive stops and subsequently applying torque to the torque head means produces no rotation of the adjusting screw.

20. The machine of claim 19 wherein the first readout means displays first predetermined information representing the position of the left tool holder assembly when the left tool holder assembly is translated against the positive stop on the left yoke, and wherein the second readout means displays the fist predetermined information representing the position of the right tool holder assembly when the right tool holder assembly is translated against the positive stop on the right yoke.

21. The machine of claim 20 further comprising:
a. third read out means for displaying selected information representing information of the theoretical optimum size of the cutting hole of the blades; and
b. key means for supplying selected information representing information of the theoretical optimum cutting hole size to the third read out means.

22. The machine of claim 21 wherein the third read out means displays information representing information of the size of the actual cutting hole of the blades instantaneously and continuously as the left and right tool holder assemblies are translated by the adjusting screw according to the formula:

$$S = R1 + R2 + R3, \text{ where}$$

S is the information displayed in the third read out;
R1 is the instantaneous value of the information displayed in the first read out means;
R2 is the instantaneous value of the information displayed in the second read out means; and
R3 is the selected information representing information of the theoretical optimum size of the cutting hole of the blades.

23. A machine for cutting through the insulation surrounding a conductor preparatory to stripping a section of the insulation from the conductor, comprising:
a base;
first and second translatable members mounted to said base for translating jointly toward and away from each other transversely to a line along which a conductor is positionable;
means for translating said translatable members jointly;
a blade holder mounted for being moved on each of said translatable members and a blade secured to each holder, the blades each having a cutting edge presented in opposed relation on opposite sides of the line of the conductor, the cutting edges defined as similar generally V-shaped notches with the apexes thereof having a radius to provide for obtaining a substantially circular opening when the notches defining the cutting edges are moved contiguous to opposite sides of the conductor for cutting through the insulation;
adjustment means respectively for adjusting the positions of said blade holders and the blades thereon individually along said translatable members relative to said line of the conductor;
stop means on the translatable members positioned such that moving said blade holders on said members away from the line of the conductor using said adjustment means until said blade holders are stopped by said stop means causing said blade holders to be in a reference position relative to said line of conductor
feedback means for producing electric signals representative of the position to which said blade holders and blades thereon are adjusted relative to said line of the conductor; and
means responding to said signals by producing positional information and individual display means responding to said information by displaying in readable form the positions of the individual blades relative to the line of the conductor.

24. The machine according to claim 23 wherein said adjustment means comprises an element fixedly mounted on each of said translatable members and an adjustment screw supported for rotation on said elements, respectively, said screws having means for rotating the screw at one end and means at an opposite end for engaging rotatably with an associated blade holder such that by rotating the screws individually, said blades are moved on said translatable members toward and away from the line of the conductor independently of each other.

25. The machine according to claim 24 wherein said means for producing electric signals representative of the positions of the blade holders is an encoder having a part fixed on said screw for rotation therewith and another part fixed to the translatable member.

26. The machine according to any one of claims 23, 24 or 25 including a stop on each of said translatable members positioned such that when the blade holder on the associated translatable member is adjusted to abut said stop, said blades are equally distant from said line of the conductor.

27. The machine according to claim 25 including a manually rotatable knob on each adjustment screw and releasable means for connecting the knob in driving relation to said adjustment screw, rotation of said knobs, respectively, to cause said blade holders to abut said stops causing said releasable means to release said knob from said driving relation for the knob to be turned without turning the screw, said stops being precisely positioned with respect to the line of the conductor so the blades are precisely positioned when the blade holders abut the stops.

28. The machine according to claim 23 wherein:
one display means indicates the distance between the cutting edge of the blade on the blade holder on said first translatable member and said line of the conductor;
another display means indicates the distance between the cutting edge of the blade on the blade holder on said second translatable member; and
a third display means indicates the size of the hole formed by the blades when the hole corresponds to the theoretical optimum diameter of the conductor.

* * * * *

UNITED STATES PATENT AND TRADEMARK OFFICE
CERTIFICATE OF CORRECTION

PATENT NO. : 5,067,379

DATED : 11/26/91

INVENTOR(S) : John D. Butler et al

It is certified that error appears in the above-identified patent and that said Letters Patent is hereby corrected as shown below:

Column 11, line 42:

Delete "step" and substitute --- stop ---.

Column 13, line 62:

Change the claim dependency from "claim 19" to read --- claim 15 ---.

Column 14, line 7:

Change the claim dependency from "claim 19" to read --- claim 15 ---.

Column 15, line 20:

Delete "fist" and substitute --- first ---.

Signed and Sealed this

Thirteenth Day of April, 1993

*Attest:*

STEPHEN G. KUNIN

*Attesting Officer*     *Acting Commissioner of Patents and Trademarks*